March 31, 1964

C. R. AMMERMAN ETAL  3,127,516
STAR TRACKER HAVING ADJUSTABLE SCAN DEPENDENT
UPON RADIATION INTENSITY

Filed May 16, 1960  4 Sheets-Sheet 1

INVENTOR
CHARLES R. AMMERMAN
DANIEL LARCHUK

BY Harmon + Kury

ATTORNEY

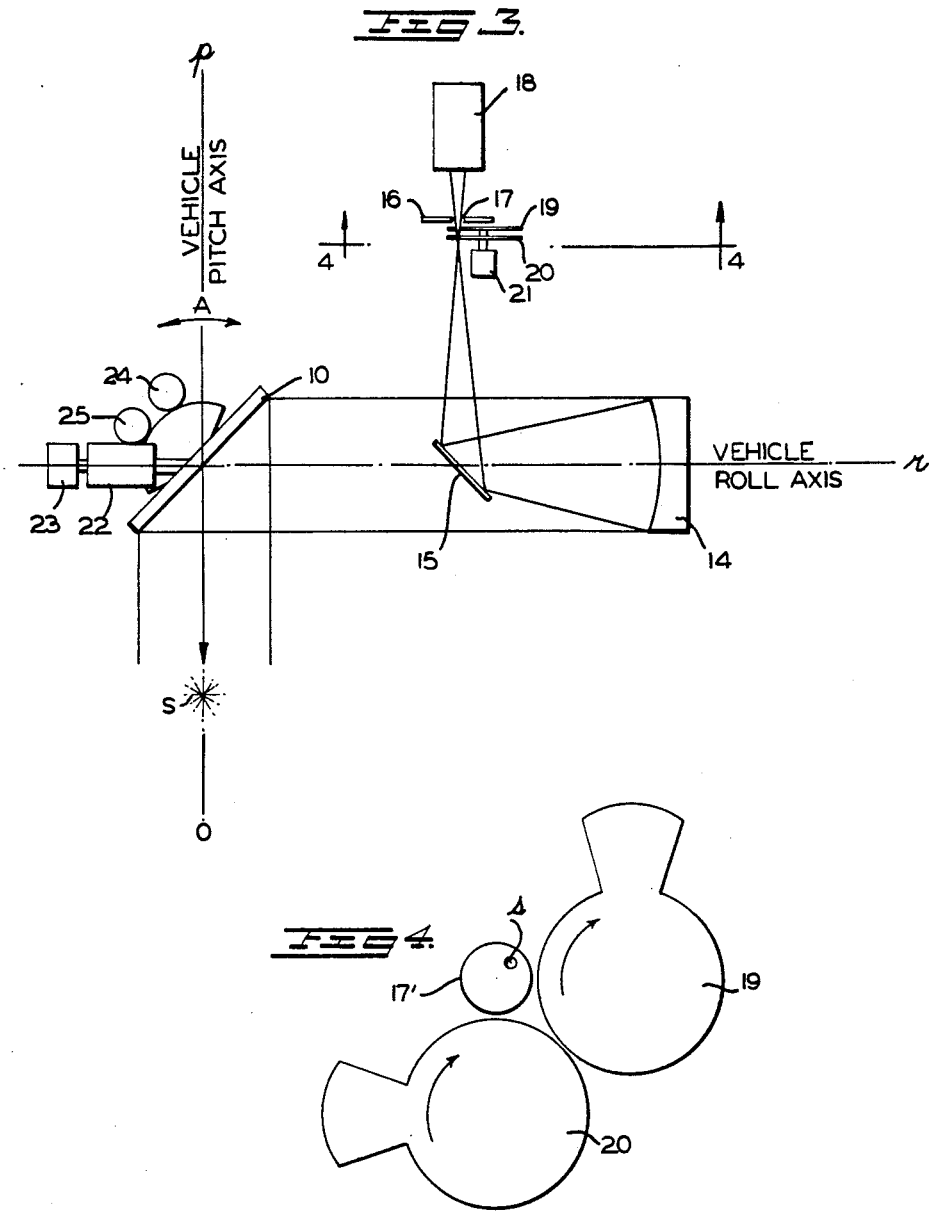

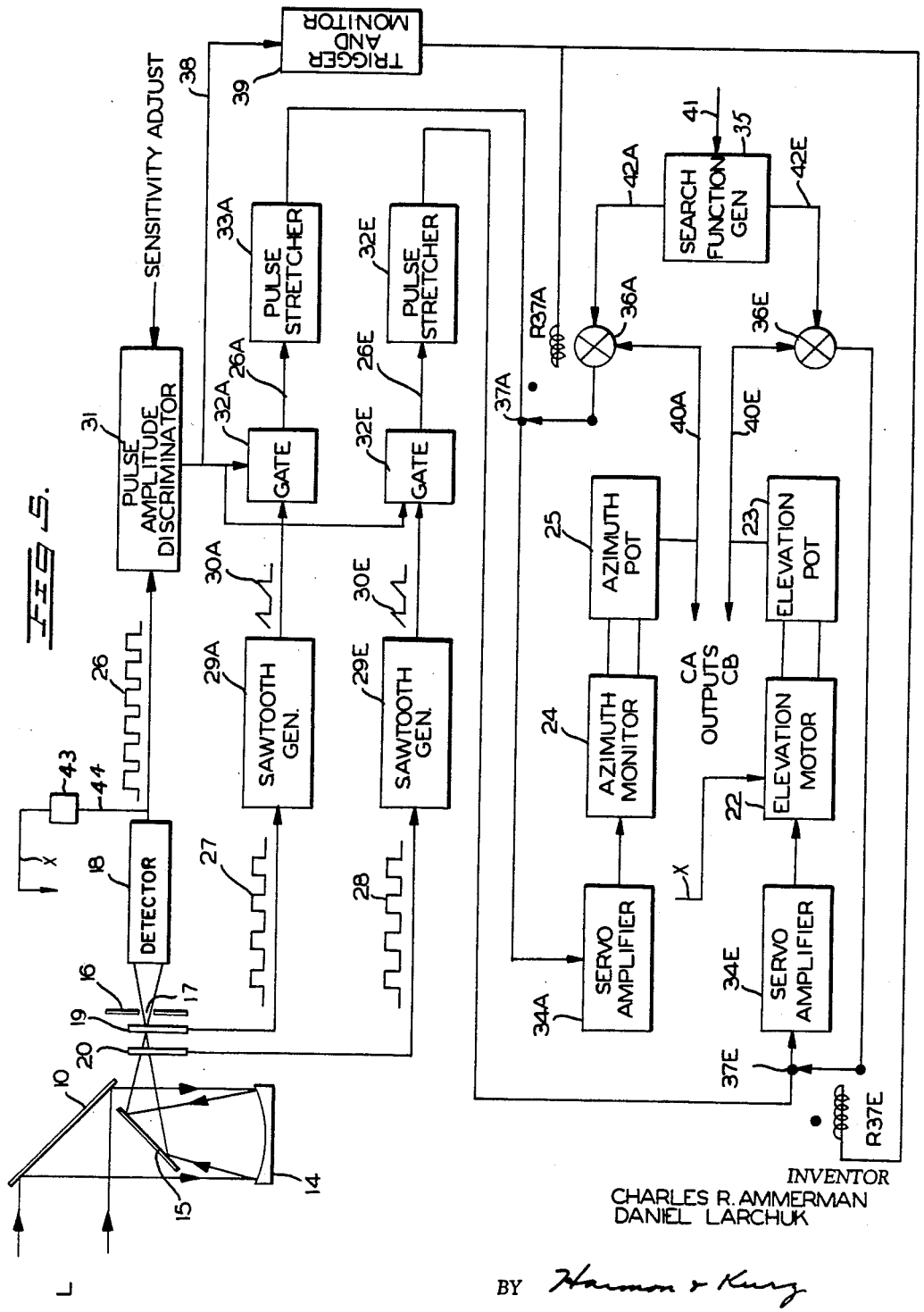

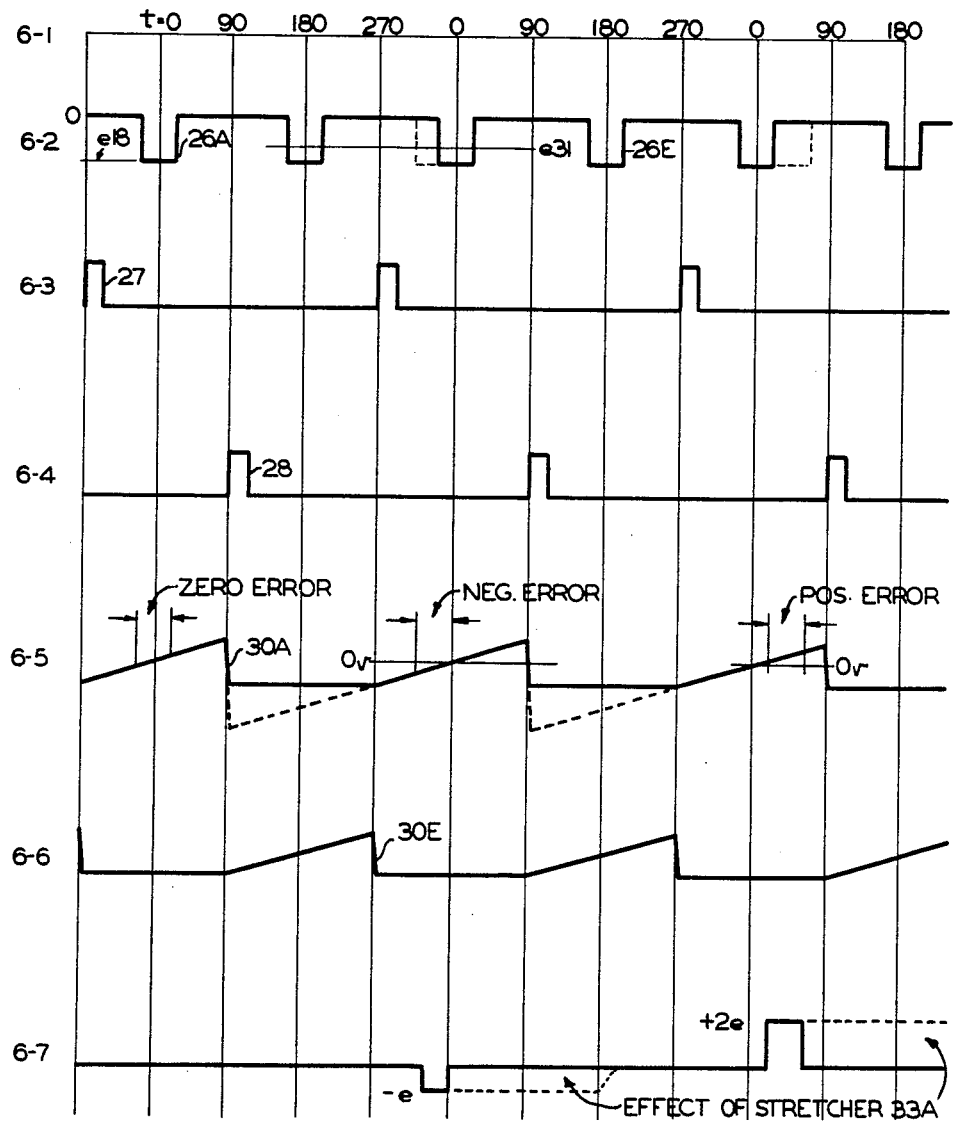

United States Patent Office 3,127,516
Patented Mar. 31, 1964

3,127,516
STAR TRACKER HAVING ADJUSTABLE SCAN DEPENDENT UPON RADIATION INTENSITY
Charles R. Ammerman and Daniel Larchuk, State College, Pa., assignors to HRB-Singer, Incorporated, State College, Pa., a corporation of Delaware
Filed May 16, 1960, Ser. No. 29,412
9 Claims. (Cl. 250—203)

The present invention relates to a star tracker for use in vehicles at altitudes above the earth's atmosphere. Specifically the present invention relates to a star tracker for use above that minimum altitude where the effects of scattered light are small compared to the brightness of the star being tracked.

In general the apparatus of the present invention may be utilized to track a star of a predetermined minimum magnitude or greater. In application of the device of the present invention in the tracking of a star of a minimum magnitude, such as a star of the sixth magnitude for example, the surrounding sky should appear black for best operation. However, the device of the present invention may be used to track stars of greater magnitude, and also may have application as a sun tracker. Depending upon the particular application which the device may have, it is contemplated that suitable optical attenuating filters may be used to correct the overall sensitivity of the device to the magnitude of the light source which is to be tracked.

One of the objects of the present invention is to provide a star tracker to successively sweep an area of the sky in a progressive spiral pattern to search a solid conical area with an apex angle up to 60°, and locate a star of a predetermined magnitude nearest to the axis of such search cone.

A further object of the present invention is to provide a star tracker capable of searching in a spiral scan and locking onto a first star located within such cone of a predetermined magnitude, and thereafter to stay locked onto such star so long as the star stays within a predetermined conical field of view.

Yet another object of the present invention is to provide a star tracker which will lock onto a star of predetermined magnitude and track the same so long as it is separated from a near star of similar magnitude by more than a predetermined amount expressed in degrees. Within such separation area the tracker of the present invention may track at a position midway between two stars of equal brightness.

An additional object of the present invention is to provide a star tracker which will search an area above the earth's atmosphere for the first star therein above a predetermined magnitude, and will subsequently lock on such an acquired star and track the same within a predetermined limited cone or area of error.

A further object of the present invention is to provide a star tracker which may be utilized to first search an area above the earth's atmosphere to locate a star and then to track such star; and alternatively to operate as a star tracker wherein the initial searching function is replaced by a function which permits the tracker to be positioned at a particular azimuth and elevation angle by means of predetermined error signals which are fed into the system.

Still another object of the present invention is to provide a star tracker system capable of generating output signals indicative of the azimuth and elevation angles as measured from such tracker to a star of predetermined magnitude.

The above and further objects and advantages of the present invention will become readily apparent to those skilled in the art in connection with the description of a preferred embodiment of the invention taken together with the accompanying drawings which follows, wherein:

FIG. 3 is a schematic representation of the components of FIG. 1 shown to an enlarged scale;

FIG. 4 is a sectional view on yet a greater scale showing specific details of the scanner of FIG. 3, taken along the section line 4—4;

FIG. 5 is a block diagram of the arrangement of electrical and servo components of the system of the star tracker of the present invention; and FIG. 6 shows the time relationship of the several electrical waveforms present in the components in FIG. 5.

Figure 1:
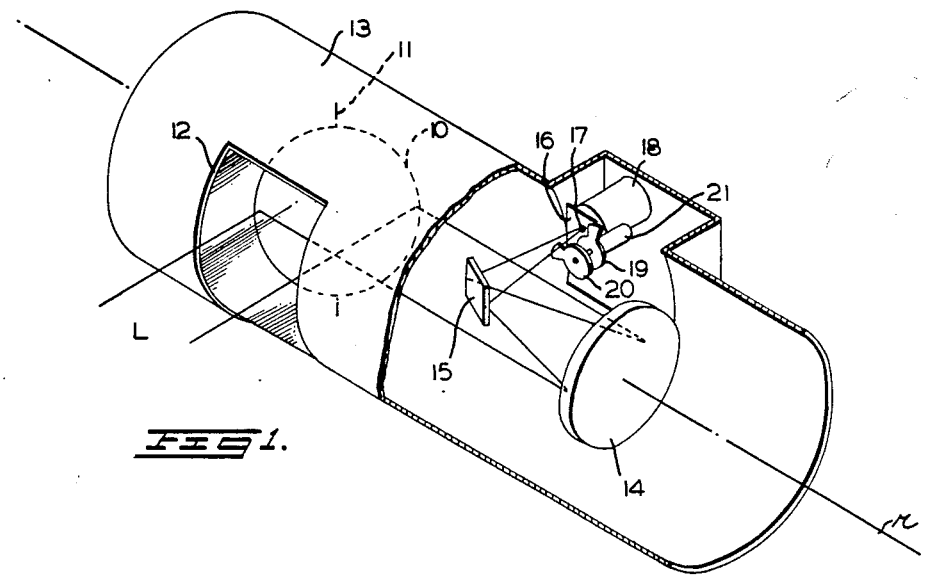
FIG. 1 is an isometric representation, partially cutaway, showing the relation of the several components of the preferred embodiment of the invention.

In accordance with the present invention the star tracker as shown in FIG. 1 includes an optical system utilizing a flat scanning mirror 10 which may be rotated about a first axis 11 by drive motor means to be described in detail hereinafter. The angular position of scanner mirror 10 with respect to the axis 11 may also be varied during the search or acquisition function as described later. Light rays L are admitted to the field of view of the mirror 10 through the viewing opening or window 12 which is provided in the face of the housing 13 adjacent to the mirror. Rays L are reflected from the scanner mirror onto a parabolic mirror 14 from which the rays are reflected onto one or more folding mirrors 15 and thereafter focused at the focal plane 16. An aperture 17 of a predetermined shape and magnitude is provided at the focal plane 16 in order to restrict the field of view of the star tracker to a predetermined solid area, which in a preferred embodiment may be of a value of 2°.

Light ray energy passing through aperture 17 is detected and changed to electrical energy by means of a detector 18, sensitive to radiation in the spectral region from the infra-red to the ultra-violet, as described hereinafter with respect to FIGS. 3 and 4. Two mechanical chopper discs 19 and 20 driven by the chopper motor 21 are utilized in conjunction with the detector 18 in order to provide servo tracking error voltages and output signal voltage information.

Choppers 19 and 20 in addition to interrupting the light beam L provide azimuth and elevation synchronizing or reference signals which, when compared with the output of detector 18, provide such error information to the servo system as to keep the optical axis of the tracker aligned with the star.

Figure 2:
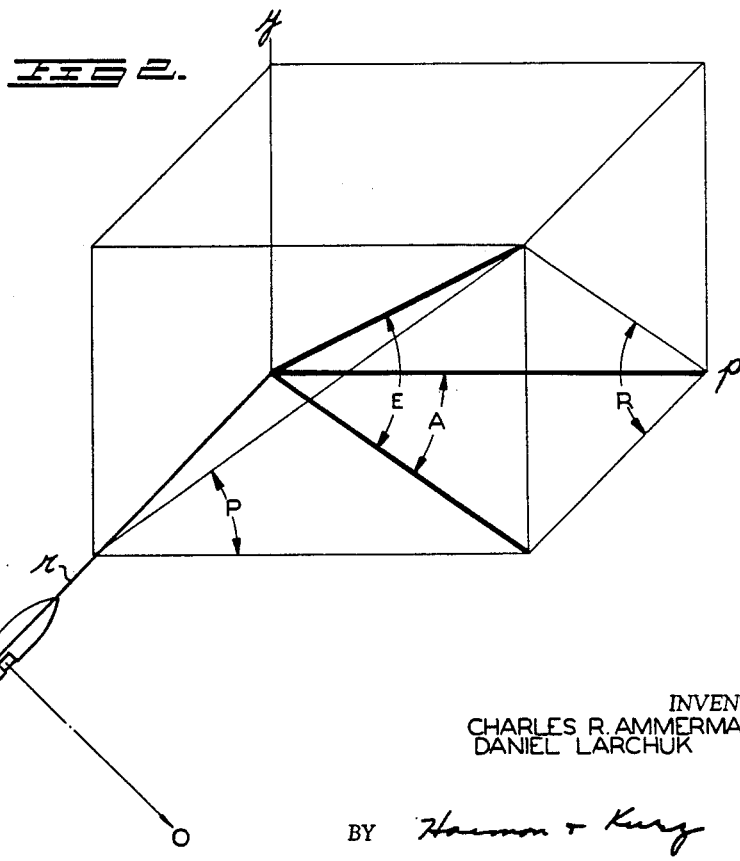
FIG. 2 is a showing of the space coordinates and angular relationships of the star tracker of the present invention.

The output signal from the tracker will be information in the form of two electrical quantities proportional to the azimuth angle A and the elevation angle E. Such angles are indicated and defined in FIG. 2. In FIG. 2 the vehicle V represented schematically therein possesses the three axes of roll, pitch and yaw as indicated by the symbols $r$, $p$ and $y$, respectively. The star tracker of the present invention when mounted in the vehicle V remains fixed in position relative to the axes of such vehicle, and the cone of its search and track area may be defined by the azimuth angle A and the elevation angle E as indicated in FIG. 2. The angles R and P shown in FIG. 2 may be computed if desired by using the proper trigonometric functions. The angle R represents the roll angle, and the angle P is the pitch angle.

Bearing in mind the axial coordinates and relationships shown in FIG. 2, reference will now be made to the schematic showing of FIG. 3 wherein the major components of the present invention are indicated. The vehicle roll axis $r$ is indicated as a horizontal line in the plan view of FIG. 3, the vehicle pitch axis $p$ is shown as a vertical line, and the vehicle yaw axis $y$ is in the plane normal to the drawing figure and passes through the intersection of axes $r$ and $p$, and is perpendicular to each of the other axes. The flat scanner mirror 10 is driven about an axis which is parallel to roll axis $r$ located at a 45° angle to the mirror surface by means of the elevation motor 22. For a star S located at zero elevation and zero azimuth angles the mirror would be in the position shown in FIG. 3. If the star was at some elevation angle E with respect to the vehicle, the mirror would be rotated about the vehicle roll axis $r$ an amount E° in order to keep star S on the optical axis O. An electrical quantity representative of the angular elevation position of scanner mirror 10 is provided by the sensor means 23 which is directly connected to the elevation motor shaft and thus to the mirror. In a preferred embodiment of the present invention such sensor 23 may be a potentiometer. In such an embodiment the elevation angle electrical data for E is read out directly from the potentiometer 23.

The mounting for the elevation motor 22 is pivotally arranged so that it may be driven about the vehicle yaw axis $y$ normal to the plane of FIG. 3 by means of an azimuth drive motor 24. The azimuth output sensor 25 is directly linked to this azimuth motion pivoting arrangement and it may be an electrical potentiometer to read out directly electric data for the azimuth angle A. For a star with azimuth angle A the elevation motor and the scanner mirror would be rotated as a unit an angular distance $A/2°$ about the yaw axis $y$.

Control or error signals are supplied to elevation motor 22 and azimuth motor 24 in order to position the scanner mirror 10 and thus the optical axis O to first carry out the initial conical scanning of an area in order to acquire a star of a predetermined light magnitude, and subsequently to track such star and to develop electrical quantities or signal components representative of the angle from the tracker to such star as measured by the elevation angle E and the azimuth angle A. When the tracker is functioning to scan a conical area on a spiral pattern, as by the means shown in FIG. 5, such spiral scan is accomplished by supplying the motors 22 and 24 with signals such that $E = K$ theta sine theta degrees and $A = K$ theta cosine theta degrees where K is a constant and theta is the total angle which has been traversed in tracing the spiral. The width of the spiral and thus the maximum value of theta depends upon the optical field of view of the tracker. The width of the spiral in degrees will be the same as the field of view expressed in degrees. If a one degree field of view is utilized, then 30 scans will be required for the scanning mirror to sweep out a 60° cone, and the maximum value of theta will be 30 times 2 radians or 60 radians. The scanning function is continued until a star enters the field of view of the optical system and a first electrical pulse is generated by means of the detector 18. At this time the search function azimuth and elevation signals are disconnected from the drive motors and the search function ceases. The servo tracking portion of FIG. 5 takes over thereafter as described hereinafter to align the optical axis O with the star S. The elevation and azimuth motors receive information from the detector 18 and move the scanner mirror 10 in such a manner that the optical axis O is maintained in alignment with the star S.

Additional control means shown in FIG. 5 and described hereafter are provided in order to monitor the output of the detector 18, and if additional light rays do not energize such tube after the search function has been switched off, indicative of the fact that the star is not being tracked, then the search function is resumed after a predetermined time delay which in the preferred embodiment may be approximately two seconds.

Reference will now be made to FIG. 5 wherein the electrical and servo motor components of a preferred embodiment of the invention are shown in relationship with the optical system components of FIG. 3. Incoming light rays L pass successively from the surface of mirror 10 to parabola 14 thence to mirror 15 and past chopper discs 20 and 19 to the focal plane 16. Such rays are admitted by the aperture 17 to the detector 18. An electrical output signal represented by the waveform 26 is derived as an output from the detector 18. It will be noted that such waveform is a modulated one possessing a square or rectangular characteristic, and such modulation is provided by means of the azimuth chopper 19 and the elevation chopper 20. Choppers 19 and 20 are driven by chopper motor 21 shown in FIG. 3 so as to cyclically and sequentially mask the aperture 17 and such masking action blocks the incoming light ray L to thus produce the rectangular waveform 26 shown in FIG. 5. The axes of rotation are positioned so that the blade of chopper 19 crosses the field of view in a vertical direction and the blade of chopper 20 crosses the field of view in a horizontal direction.

Concurrently with the rotation of chopper discs 19 and 20, azimuth synchronizing signals 27 and elevation synchronizing signals 28 are generated by any convenient means, such as by commutator segments and brushes, for example, and such waveforms are indicated schematically in FIGS. 5 and 6. Choppers 19 and 20 may have any suitable shape so as to block the path of light ray L in sequence, and one configuration and relationship capable of effecting such operation is represented in the enlarged view of FIG. 4. Chopper discs 19 and 20 are rotated at the same rate by the motor 21 and thus maintain therebetween a particular predetermined angular relationship which may be as shown in FIG. 4; a relationship of 90°. It will be apparent that for each 360° rotational cycle that chopper 19 will first obturate or mask the opening indicated as 17' in the figure and then 180° later in rotation the chopper 20 will block the opening or area indicated by the circle 17'. Circle 17' may be regarded as representative of the circular field of view of the optical system at the focal plane 16 or it may actually represent the circular opening of an aperture previously indicated as element 17 in the other drawing figures. Whether circle 17' represents the field of view or the actual aperture opening depends upon the particular scale and the location of section line 4—4 utilized in the showing of FIG. 4, and in any event it is of no particular moment due to the fact that either representation would be suitable for the following discussion. Within the circular area 17' the optical image of the star S is designated by the smaller circle $s$. When the star image $s$ lies upon the intersection of the azimuth and elevation axes shown in FIG. 4, the alternate pulses of waveform 26 generated by the detector 18 will bear a fixed time relationship to the successive azimuth and elevation reference pulses 27 and 28, since such reference pulses are generated at times which are fixed with respect to the instants the respective choppers cross the azimuth and elevation axes. However, when the optical axis O is not centered directly upon the star S then the star image $s$ does not appear at the origin or point of axial crossing and will be displaced to some degree, for example as indicated in FIG. 4. Therefore the voltages generated by detector 18 as indicated by waveform 26 will bear a certain time difference with respect to the synchronizing signals generated by choppers 19 and 20. FIG. 6 shows the relative time relationships between such voltages. Voltages proportional to this time difference between the currents of the pulses of waveform 26 and the synchronizing pulses of waveforms 27 and 28 are generated and fed to the azimuth motor 24 and elevation motor 22, respectively, so that the scanner mirror 10 is moved to align the star image $s$ with the optical axis O and reduce the positional error as measured by the time difference between such pulses to zero.

The manner in which the positional errors of azimuth and elevation are utilized in order to control the drive motors is shown in FIG. 5. It will be apparent to those skilled in the art that a closed loop servo system is shown in this figure with the light beam from the star S, or more precisely the star image s, being a part of such loop as it energizes the face of the detector 18. The servo and positional components of the azimuth and elevation channels are identical in form and operation. The azimuth channel will be first described, however, it will be appreciated that the elements and components of the elevation channel will be identical to those of the azimuth channel, and similar reference numerals have been applied to such similar components with the subscripts A and E indicating the azimuth and elevation components respectively. The synchronizing signal 27 developed by the azimuth chopper disc 19 is fed as a control input to the azimuth saw tooth wave generator 29A. The output of such generator is a cyclically repeated series of saw tooth voltages as indicated by wave form 30A, and such voltages are repeated every 180° of time sequence. In a similar manner elevation saw tooth waves 30E are generated by the generator 29E and these waves as indicated in FIG. 6 also occur cyclically with a 180° time sequence, however, such time of occurrence is displaced 90° from that of the azimuth saw tooth waves 30A. The output wave from detector tube 18 as indicated in the waveform 26 represents a series of cyclically repeated negative-going interleaved azimuth and elevation error or position signals, 26A and 26E, respectively, and such cyclic rectangular wave is fed into a pulse amplitude discriminator 31. The particular amplitude level for discrimination and/or limiting may be adjusted by means of a level control such as that indicated at the second input to discriminator 31 by the legend "Sensitivity Adjust." The output of the pulse amplitude discriminator is fed to the azimuth gate 32A and to the elevation gate 32E.

Azimuth gate 32A is a coincidence device wherein in order to generate an output error pulse there must be present both the saw tooth wave input 30A and the azimuth error pulse 26A at some common time period during the rise-time of the saw tooth wave 30A in order to generate an output error azimuth pulse 26A. The particular time arrangement between such pulses is indicated in FIG. 6. Referring to this figure it will be noted that the position of the input signal pulse 26a may vary in time as indicated by the dotted representations thereof in waveform diagram 6–2. The saw tooth wave is first passed through a suitable circuit arrangement within gate 32A to clamp or fix the rise portion thereof such that the wave as applied to the coincidence circuit of such gate varies above and below a zero level or value as shown in diagram 6–5. To this voltage is added the voltage of the azimuth signal pulse 26A as an algebraic addition with the result that the output azimuth error pulse 26A may bear either a positive or negative value in accordance with whether the azimuth error represents a positive or negative value as measured with respect to the pitch axis p as indicated in FIG. 2. When the optical axis O of the scanner is aligned with the light rays from the star S the value of the ouput azimuth error pulse 26A will be zero as represented by the solid line waveform in diagram 6–7. Thus it will be seen that the azimuth gate 32A functions to convert the time-displacement error azimuth signal pulse 26A into a D.C. pulse whose polarity is representative of the direction of azimuth displacement and whose magnitude is representative of the magnitude of such displacement.

Azimuth error signal pulses 26A are applied to a servo amplifier 34A, the output of which serves to control the azimuth drive motor 24. A pulse stretcher 33A may be included between the gate 32A and the servo amplifier 34A if desired in order to develop an error signal of usable time duration. In accordance with the polarity and magnitude of the azimuth error pulses 26A the azimuth motor 24 will be driven in the proper direction and amount to reduce such error signal voltage to zero, at which time the optical axis O of the tracker will be aligned in azimuth with the star S.

In a similar manner the elevation error pulses 26E are fed to the servo amplifier 34E to control the elevation motor 22 drive the same in the proper direction and amount in order to reduce the elevation error pulse voltage to zero. At such time the optical axis O will be aligned in elevation with the star S. Voltages indicative of the azimuth position and elevation position may be read out from the potentiometers 25 and 23 respectively, as indicated by the outputs CA and CE wherein C designates a constant.

In order to perform the initial search function by means of a spiral scan as described earlier, a search function generator 35 is provided as indicated on FIG. 5. The output of generator 35 consists of two varying control signals as indicated by the legend "K theta sin theta" and "K theta cos theta," and such control voltages are fed through mixers 36A and 36E respectively in order to introduce respective azimuth and elevation servo control signals. Such signals are fed through the azimuth search function switch 37A and the error search function switch 37E to control the azimuth and elevation servo amplifiers to direct the azimuth and elevation motors to cause the scanner mirror 10 to sweep a spiral scan. The search error switches 37A and 37E are shown in the search position, but upon receipt of a continuing signal as generated by the detector phototube 18 an output wave from such detector and the subsequent pulse amplitude discriminator 31 is fed by means of a lead 38 to the trigger and monitor generator 39. The output of 39 is supplied to the relay coils R37A and R37E to control the search error switches. Once a star S is brought within the field of view of mirror 10 during its spiral scan and pulses 26 are generated at the output of the detector 18, then relays R37A and R37E are energized in order to move the switches 37A and 37E from the positions as shown in FIG. 5 to the open-circuit location. At such time the only input to the azimuth and elevation servo amplifiers will be error signals as generated in the gates 32. However, should pulses 26 fail to continue to be generated by the detector 18, then there will be no input to the generator 39 over the lead 38 and after a predetermined time the relays R37A and R37E will be released in order to re-position the search error switches so as to close the circuits from search function generator 35 and thus control the drive motors to again place the scanner in its search function.

In accordance with well known servo follow-up practices an azimuth feedback voltage 40A and a corresponding elevation feedback voltage 40E are applied as a second input to the mixers 36A and 36E.

Terminal 41 represents schematically a source of input to the search function generator 35. Such input may be varied or chosen so as to determine the value of theta and thus control the searching rate and the total angle which is traversed in tracing the spiral of the search. Alternatively, the leads 42A and 42E may be utilized in order to set in a predetermined desired pair of data signals which will cause the search phase or function to stop at a particular azimuth angle and elevation angle in order to acquire a desired star whose coordinates are known. Such alternative mode of operation is used when it is desired to lock on a particular star and the coordinates thereof in azimuth and elevation are known accurately within the error allowances of the entire star tracker electro-optical system.

In order to protect the detector 18 from intense radiation, such as might be obtained from the sun, the system is provided with a detector output monitoring system 43 which is connected by a line 44 to the output from detector 18. The output of monitoring system 43 is connected by line X to the motor 22 as is illustrated in FIGURE 5. In the event of an incoming signal of an intensity above a predetermined radiation level, an output signal along line X from system 43 will energize motor 22 to move the mirror 10 so that no energy would be reflected onto the parabolic mirror 14. Hence the detector 18 will be protected from damaging effects. An inbuilt time delay means (not shown) in system 43 permits motor 22 to return the mirror 10 to its scanning attitude after a predetermined period of time. At that point if the source of intense radiation is not within the scan of mirror 10, the system will function as described and monitoring system 43 will remain inactive. If during the period of tracking system inactivity, an original star fix was lost, then the search function would go into action to acquire the same or another star.

Obvious structural and component modifications of the invention as described and illustrated herein are deemed to be within the spirit and scope of the appended claims.

We claim:

1. An electro-optical system comprising, in combination, an optical receiver having at least an optical axis and a field of view, said receiver including means to collect ray energy from an illumination source and focus said energy in a plane, means having an aperture in such focal plane to define the optical field of view, means to modulate said collected ray energy in accordance with azimuth and elevation relations between said source and said system, transducer means located in optical alignment beyond said aperture to produce electrical signals representative of modulated collected ray energy passing through said aperture, means to separately position said receiver optical axis in azimuth and in elevation, first control means to cause said positioning means to move said receiver optical axis until an illumination source is located, means to de-energize said first control means upon the location of said illumination source, and second control means responsive to the resultant modulated electrical signals to produce electrical signals representative of the error in the azimuth and elevation relations between said source and said system, said second control means causing said positioning means to continuously adjust the receiver optical axis to track said illumination source, and a monitoring system connected with the output of said ray energy collecting means to be responsive to output signal strength above a predetermined level to energize the receiver positioning means so as to adjust the scan of the receiver away from a source of illumination of too great an intensity for the system.

2. An electro-optical system comprising, in combination, an optical receiver having at least an optical axis and a field of view, said receiver including means to collect ray energy from an illumination source and focus said energy in a plane, means having an aperture in such focal plane to define the optical field of view, means to modulate said collected ray energy in accordance with azimuth and elevation relations between said source and said system, said modulating means concurrently generating reference signals representative of zero azimuth and zero elevation deviation between said receiver optical axis and a linear ray path extending from said source to said system, transducer means located in optical alignment behind said aperture to produce electrical signals representative of the modulated collected ray energy passing through said aperture, means to separately position said receiver optical axis in azimuth and elevation, first control means to cause said positioning means to move said receiver optical axis until an illumination source is located, means to de-energize said first control means upon the location of said illumination source, second control means responsive to the resultant modulated electrical signals energized upon the de-energization of said first control means to produce electrical signals representative of the position error relationships between said source and said system, said second control means including comparator means for comparing said elevation and azimuth reference signals generated by said modulated means with the modulated output wave from said transducer means to obtain azimuth and elevation error signals, and means to feed said azimuth and elevation error signals through said positioning means to cause said positioning means to continuously adjust the receiver optical axis to track said illumination source.

3. The invention according to claim 2, wherein the reference signals representative of zero azimuth deviation produced by said modulating means are displaced 90° in phase relative to the reference signals representative of zero elevation deviation produced by said modulating means.

4. The invention according to claim 2, wherein said comparator means includes an azimuth comparator gating means connected to receive and compare said azimuth reference signals from said modulating means with the modulated output wave from said transducer means to obtain an azimuth error signal and an elevation comparator gating means connected to receive and compare said elevation reference signals from said modulating means with the modulated output wave from said transducer means to obtain an elevation error signal.

5. The invention according to claim 2, wherein a monitoring system is connected to the output of said detector, said monitoring system responsive to an output signal strength above a predetermined level to energize the receiver positioning means so as to adjust the scan of the receiver away from the source of illumination of too great an intensity for the system.

6. An electro-optical system comprising, in combination, an optical receiver having at least an optical axis and a field of view, means to separately position said receiver optical axis in azimuth and in elevation, said receiver including means to collect ray energy from an illumination source and focus said energy in a plane, means having an aperture in such focal plane to define the optical field of view, means to modulate said collected ray energy in accordance with azimuth and elevation relations between said source and said system, said modulating means concurrently generating reference signals representative of zero azimuth and zero elevation deviation between said receiver optical axis and a linear ray path extending from said source to said system, transducer means located in optical alignment beyond said aperture to produce electrical signals representative of modulated collected ray energy passing through said aperture, means responsive to the resultant modulated electrical signals to indicate the azimuth and elevation relations between said source and said system, further means responsive to the resultant modulated electrical signals to maintain said receiver positioned in azimuth and elevation in optical alignment with said illumination source, and a monitoring system connected with the output of the ray energy collecting means to be responsive to output signal strength above a predetermined level to energize the receiver positioning means so as to adjust the scan of the receiver away from a source of illumination of too great an intensity for the system.

7. An electro-optical system in accordance with claim 6 wherein said means to modulate includes a pair of rotary shutter elements for sequentially blocking said collected ray energy to produce azimuth and elevation signals indicating instantaneous deviations measured between said receiver optical axis and a linear ray path extending from said source to said system, and to concurrently generate reference signals representative of zero azimuth and elevation deviations therebetween.

8. An electro-optical system adapted to derive measurements indicative of the angular relation between said system and a source of illumination comprising, in combination, an optical receiver having an optical axis and a field of view, said receiver including an adjustable scanning mirror to receive and reflect ray energy from an illumination source, means to separately position said receiver optical axis in azimuth and elevation, said positioning means including an elevation motive means and an azimuth motive means mounted to drive said scanning mirror and sensor means mounted upon said elevation and azimuth motive means to provide an electrical output quantity representative of the angular position of said scanning mirror, optical means to receive the reflected ray energy from said scanning mirror and to focus said energy in a plane to produce therein an image of said illumination source, means having an aperture in such focal plane to define the optical field of view, the position of said image within said field of view being determined by the position of said receiver optical axis relative to said illumination source, transducer means located in optical alignment behind said aperture to produce electrical signals representative of the collected ray energy passing through said aperture, means to modulate said collected ray energy whereby said transducer means is caused to provide a modulated output wave varied in time by the position of said image within said field of view, said modulating means including a pair of shutter elements for sequentially blocking said field of view and for concurrently generating reference signals representative of zero azimuth and elevation deviation between said receiver optical axis and said illumination source, a closed servo-loop system for controlling said elevation and azimuth motive means, said servo-loop system including means for separately comparing said elevation and azimuth reference signals with the modulated output wave from said transducer means to obtain separate azimuth and elevation error signals, means to separately feed said azimuth error signals to said azimuth motive means and said elevation error signals to said elevation motive means to cause alignment of said receiver optical axis with said illumination source, and a scan control unit electrically connected to said elevation and azimuth motive means to provide an initial scanning function whereby an illumination source is located within the field of vision of said receiver, said scan control unit including a varying source of elevation and azimuth control voltage and switch control means positioned between said control voltage source and said azimuth and elevation motive means, said switch control means acting to disconnect said scan control unit from said azimuth and elevation motive means upon receipt of an initial output signal from said detector.

9. The invention according to claim 8 wherein a monitoring system is connected to the output of said detector, said monitoring system responsive to an output signal strength above a predetermined level to energize said elevation motive means whereby said scanning mirror is adjusted to move said receiver optical axis away from a source of illumination of too great an intensity for the system.

References Cited in the file of this patent
UNITED STATES PATENTS

| | | |
|---|---|---|
| 2,905,828 | O'Maley et al. | Sept. 22, 1959 |
| 2,922,224 | Gray | Jan. 26, 1960 |
| 2,930,894 | Bozeman | Mar. 29, 1960 |
| 2,966,591 | McCartney | Dec. 27, 1960 |
| 3,012,148 | Snyder et al. | Dec. 5, 1961 |
| 3,064,924 | Fairbanks | Nov. 20, 1962 |
| 3,087,986 | De Brosse | Apr. 30, 1963 |
| 3,088,033 | Kaufold | Apr. 30, 1963 |
| 3,090,583 | Behun et al. | May 21, 1963 |